(12) United States Patent
Kwon et al.

(10) Patent No.: US 8,171,279 B2
(45) Date of Patent: May 1, 2012

(54) MULTI PROCESSOR SYSTEM HAVING DIRECT ACCESS BOOT AND DIRECT ACCESS BOOT METHOD THEREOF

(75) Inventors: Jin-Hyoung Kwon, Seongnam-si (KR); Han-Gu Sohn, Suwon-si (KR)

(73) Assignee: Samsung Electronics Co., Ltd., Suwon-Si, Gyeonggi-Do (KR)

( * ) Notice: Subject to any disclaimer, the term of this patent is extended or adjusted under 35 U.S.C. 154(b) by 867 days.

(21) Appl. No.: 12/211,183

(22) Filed: Sep. 16, 2008

(65) Prior Publication Data

US 2009/0089573 A1  Apr. 2, 2009

(30) Foreign Application Priority Data

Sep. 28, 2007  (KR) .................. 10-2007-0097644

(51) Int. Cl.
*G06F 9/00* (2006.01)
*G06F 15/177* (2006.01)

(52) U.S. Cl. ............... 713/2; 713/1; 711/147; 711/149; 711/153

(58) Field of Classification Search .............. 713/1, 2; 711/147, 149, 153
See application file for complete search history.

(56) References Cited

U.S. PATENT DOCUMENTS

| | | | | |
|---|---|---|---|---|
| 5,835,784 A * | 11/1998 | Gillespie et al. | ............... | 710/10 |
| 6,377,979 B1 * | 4/2002 | Yamashita et al. | ............ | 709/213 |
| 6,400,717 B1 * | 6/2002 | Von Ahnen et al. | ..... | 370/395.63 |
| 6,438,683 B1 * | 8/2002 | Endsley | ............. | 713/1 |
| 7,493,460 B2 * | 2/2009 | Zimmer et al. | ............... | 711/166 |
| 7,600,109 B2 * | 10/2009 | Ueltschey et al. | ................ | 713/2 |
| 7,882,344 B2 * | 2/2011 | Byun et al. | ........................ | 713/2 |
| 7,913,073 B2 * | 3/2011 | Choi | ................................. | 713/2 |
| 2003/0172261 A1 | 9/2003 | Lee et al. | | |
| 2007/0136536 A1 * | 6/2007 | Byun et al. | .................... | 711/149 |
| 2007/0283137 A1 * | 12/2007 | Ueltschey et al. | ................ | 713/1 |
| 2008/0072031 A1 * | 3/2008 | Choi | ................................. | 713/2 |
| 2009/0070789 A1 * | 3/2009 | Huscroft et al. | .............. | 719/321 |
| 2010/0002099 A1 * | 1/2010 | Min et al. | .................. | 348/231.99 |

FOREIGN PATENT DOCUMENTS

| | | |
|---|---|---|
| JP | 200510942 A | 1/2005 |
| JP | 2006155303 A | 6/2006 |
| KR | 10-2007-0044268 A | 4/2007 |

* cited by examiner

*Primary Examiner* — Thomas Lee
*Assistant Examiner* — Jaweed A Abbaszadeh
(74) *Attorney, Agent, or Firm* — Volentine & Whitt, PLLC (57) ABSTRACT

A multiprocessor system having a direct access boot operation and a direct access boot method are provided to substantially reduce a boot error of processor that does not provide a memory link architecture in the multiprocessor system. In an embodiment of the invention, a multiprocessor system includes: a first processor configured to perform a first predetermined task; a second processor configured to perform a second predetermined task; a multiport semiconductor memory device coupled to the first processor and the second processor, the multiport semiconductor memory device including at least one shared memory area, the multiport semiconductor memory device configured to provide access to the at least one shared memory area by the first processor and the second processor; and a non-volatile memory device coupled to the first processor and the second processor, the non-volatile memory device storing a first boot code associated with the first processor and a second boot code associated with the second processor, the multiprocessor system configured to provide the first processor direct access to the non-volatile memory area during a boot operation and indirect access to the non-volatile memory area otherwise.

20 Claims, 9 Drawing Sheets

MULTI PROCESSOR SYSTEM HAVING DIRECT ACCESS BOOT AND DIRECT ACCESS BOOT METHOD THEREOF

CROSS REFERENCE TO RELATED APPLICATIONS

This application claims priority under 35 U.S.C. §119 from Korean Patent Application 10-2007-0097644, filed on Sep. 28, 2007, the contents of which are hereby incorporated by reference in their entirety for all purposes as if fully set forth herein.

BACKGROUND OF THE INVENTION

1. Field of the Invention

The present invention relates generally to a multiprocessor system, and more particularly, but without limitation, to a direct access boot utility in a multipath architecture.

2. Description of the Related Art

Some electronic instruments, such as portable multimedia players (PMPs), handheld phones (HHPs), and personal digital assistants (PDAs) include multiple processors within one system to achieve high-speed operation. In such a system, a semiconductor memory device must be adapted for multiprocessor access. For example, the memory device may have multiple access ports, and it may be required to simultaneously input/output data through the multiple access ports.

One type of semiconductor memory device having two access ports is called a dual-port memory. A known dual-port memory used for image processing applications includes a random access memory (RAM) port accessible in a random sequence and a sequential access memory (SAM) port accessible only in a serial sequence. Dual-port memory has limited application, however.

A Dynamic Random Access Memory (DRAM) that does not employ an SAM port, and for which a shared memory area is accessible by processors through multiple access ports, is called herein a multiport semiconductor memory device or multipath-accessible semiconductor memory device to distinguish from the dual-port memory. An example of a conventional art multiport semiconductor memory is disclosed in U.S. Publication No. 2003/0093628. As disclosed therein, a memory array is constructed of first, second and third portions. The first portion of the memory array is accessed only by a first processor, the second portion is accessed only by a second processor, and the third portion is a shared memory area accessed by the first and the second processors. Some known multiprocessor systems include a multiport DRAM memory device and a single flash memory device.

Multiprocessor systems present many technical challenges, however. One such issue is multiprocessor access to a single flash memory device, for example, to quickly obtain boot code in each of the multiple processors. For this and other reasons, improved multiprocessor architectures are needed.

BRIEF SUMMARY OF THE INVENTION

Embodiments of the invention provide a multiprocessor system capable of simplifying a booting procedure and increasing a booting speed in an initial boot of the multiprocessor system.

According to an embodiment of the invention, a multiprocessor system includes: a first processor configured to perform a first predetermined task; a second processor configured to perform a second predetermined task; a multiport semiconductor memory device coupled to the first processor and the second processor, the multiport semiconductor memory device including at least one shared memory area, the multiport semiconductor memory device configured to provide access to the at least one shared memory area by the first processor and the second processor; and a non-volatile memory device coupled to the first processor and the second processor, the non-volatile memory device storing a first boot code associated with the first processor and a second boot code associated with the second processor, the multiprocessor system configured to provide the first processor direct access to the non-volatile memory area during a boot operation and indirect access to the non-volatile memory area otherwise.

BRIEF DESCRIPTION OF THE DRAWINGS

The invention will become more fully understood from the detailed description below and the accompanying drawings, which are given by way of illustration only, and wherein.

DETAILED DESCRIPTION

Embodiments of the invention now will be described more fully hereinafter with reference to the drawings, in which embodiments of the invention are shown. This invention may, however, be embodied in many different forms and should not be construed as limited to the embodiments set forth herein. Rather these embodiments are provided so that this disclosure will be thorough and complete, and will fully convey the scope of the invention to those skilled in the art.

Unless otherwise defined, all terms (including technical and scientific terms) used herein have the same meaning as commonly understood by one of ordinary skill in the art to which this invention belongs. It will be further understood that terms used herein should be interpreted as having a meaning that is consistent with their meaning in the context of this specification and the relevant art and will not be interpreted in an idealized or overly formal sense unless expressly so defined herein.

Figure 1:
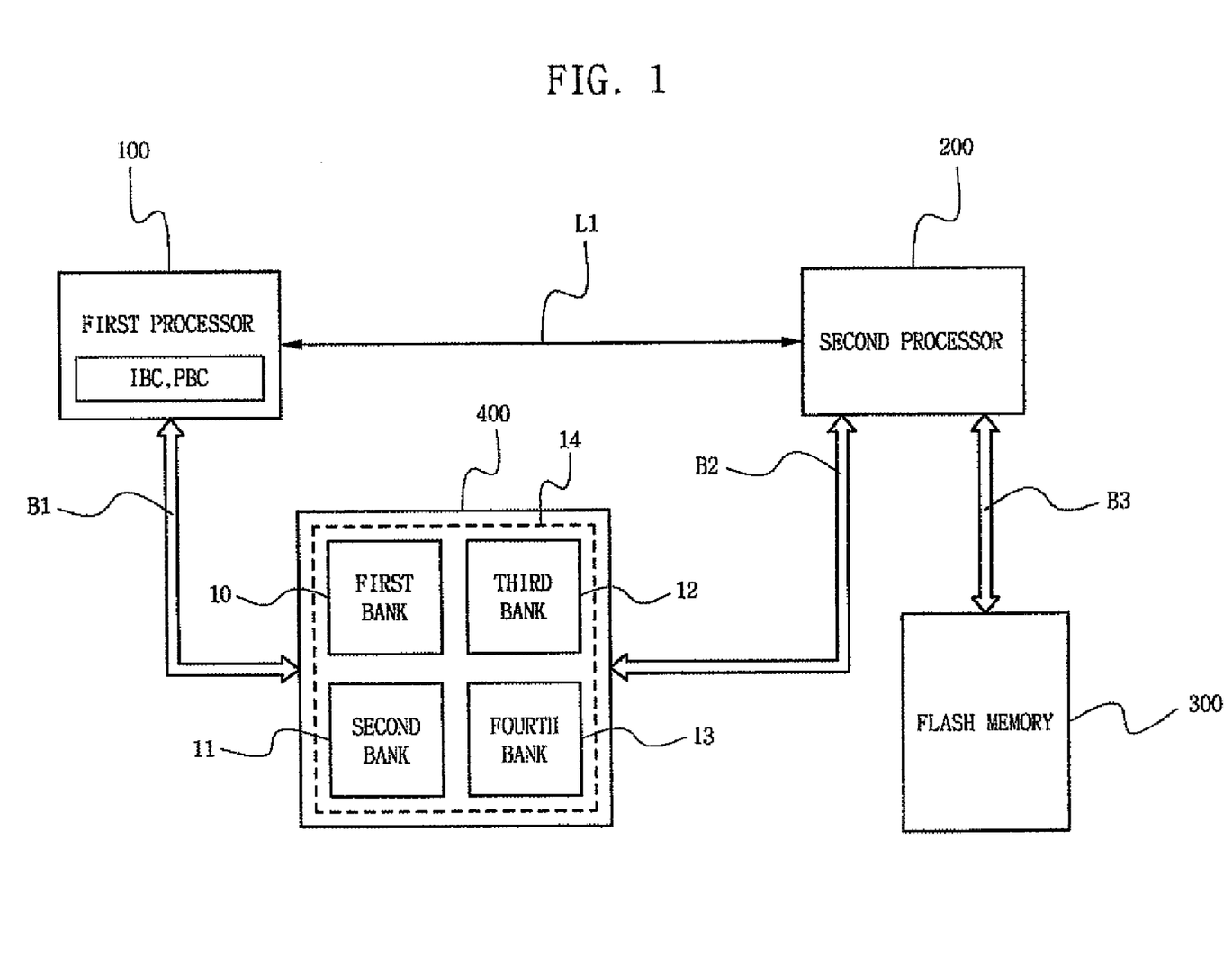
FIG. 1 is a block diagram of multiprocessor system.

FIG. 1 is a block diagram of a multiprocessor system. The multiprocessor system illustrated therein and described below may be suitable, for example, in a mobile communication system.

As shown in FIG. 1, the multiprocessor system includes first and second processors 100 and 200, a multiport DRAM 400, and a flash memory 300. The multiport DRAM 400 is coupled to the first and second processors 100 and 200, and the flash memory 300 is coupled to the second processor 200. The first processor 100 may function, for example, as a communication signal Modulator/Demodulator (MODEM), and the second processor 200 may execute a game or other high-level application program.

The flash memory 300 may be an NOR flash memory or a NAND flash memory. NOR flash memory and NAND flash memory are nonvolatile memory devices constructed of MOS transistors with floating gates. Such nonvolatile memory devices are adapted to store instructions or data that must not be deleted even if power is turned off. Such instructions or data may be or include, for example, boot codes or other preservation data.

The multiport DRAM 400 functions as a main memory for data associated with processors 100 and 200. The multiport DRAM includes two ports (not shown). A first port (not shown) is coupled to system bus B1 and a second port (not shown) is coupled to system bus B2. The multiport DRAM 400 is coupled to the first processor 100 via the system bus B1, and is further coupled to the second processor 200 via the system bus B2.

In the multiport DRAM 400 of FIG. 1, a memory cell array 14 includes four memory areas 10, 11, 12 and 13. The first bank 10 may only be accessed by the first processor 100 via system bus B1, and the third and fourth banks 12 and 13 may only be accessed by the second processor 200 via the system bus B2. The second bank 11 may be accessed by the first processor 100 via the system bus B1 and also by the second processor 200 via the system bus B2. In other words, in the multiport DRAM 400, the second bank 11 may be a shared memory area, and the first, third and fourth banks 10, 12 and 13 may be dedicated memory areas. Each of the first, second, third, and fourth banks 10, 11, 12, and 13 may include, for instance, 64 Mb, 128 Mb, 256 Mb, 512 Mb or 1024 Mb of memory.

Link L1 couples the first processor 100 with the second processor 200, and bus B3 couples the flash memory 300 to the second processor 200.

In the multiprocessor system illustrated in FIG. 1, the first processor 100 is not directly linked to the flash memory 300. Accordingly, there are at least three ways the multiprocessor system can be configured to supply the boot code to the first processor 100. First, second processor 200 may read the boot code from the flash memory 300 and transfer the boot code to the shared memory area 11. Then the first processor 100 may read the boot code from the shared memory area 11. Second, the second processor 200 could be configured to read the boot code from the flash memory 300 and transmit the boot code to the first processor 100. Third, the first processor 100 could include or be coupled to its own flash memory (not shown), for example on-chip non-volatile memory, or a dedicated non-volatile memory device, that contains boot code for the first processor 100.

In the first and second case, the boot of the first processor 100 may be unreliable due to the time delay in routing boot code for the first processor 100 through the second processor 200. The third case may be acceptable for at least some applications so long as device or board-level packaging allows for the addition of non-volatile memory that is dedicated to the first processor 100.

Figure 2:
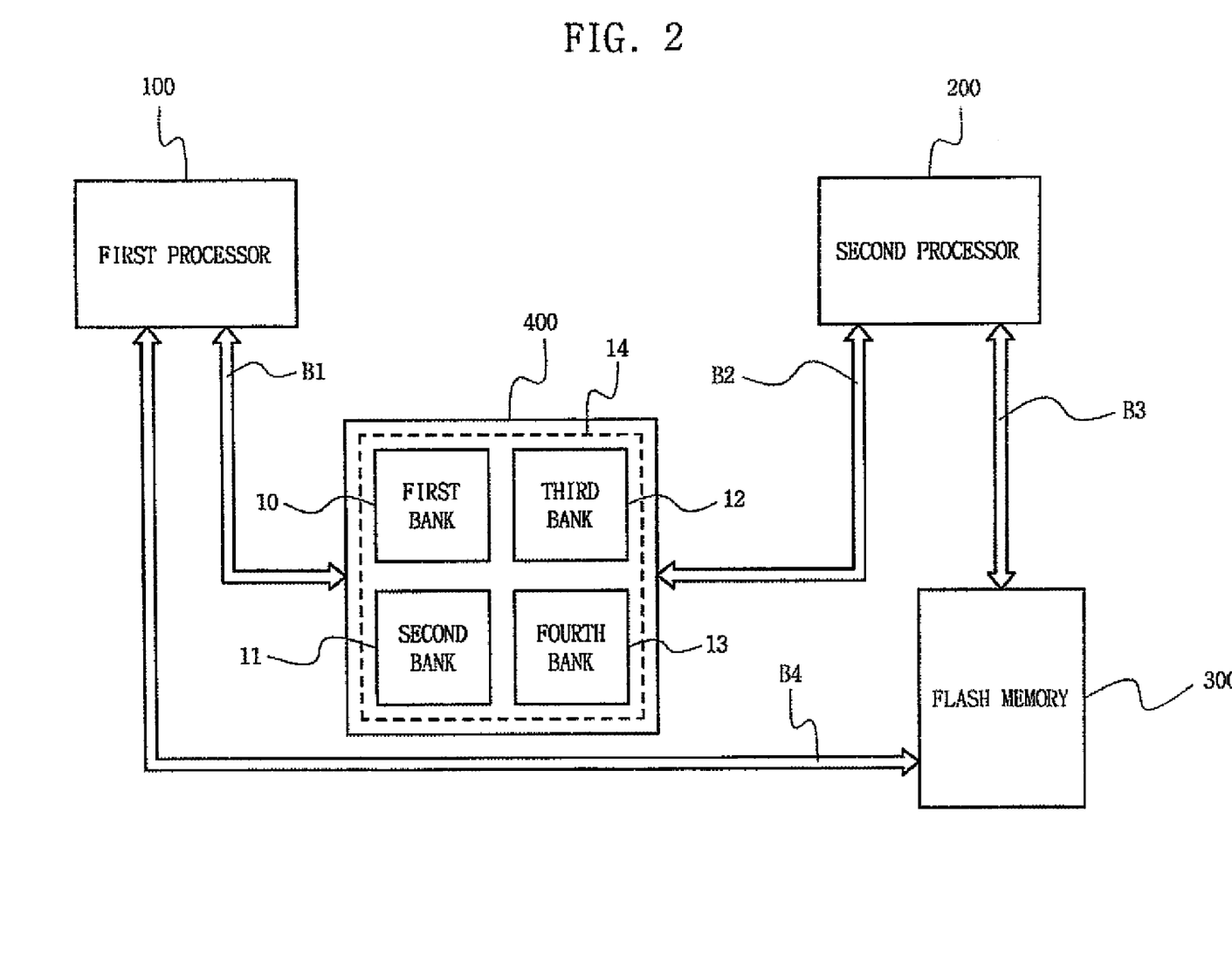
FIG. 2 is a block diagram of multiprocessor system having a direct access boot operation according to an embodiment of the invention.

FIG. 2 is a block diagram of multiprocessor system having a direct access boot operation according to an embodiment of the invention. The multiprocessor system in FIG. 2 is configured like the multiprocessor system in FIG. 1 except as described below.

In the multiprocessor system of FIG. 2, the first processor 100 is directly connected to the flash memory 300 through a bus B4. Thus, in an initial boot, the first processor 100 directly receives boot code through the flash memory 300, and booting speed is increased compared with boot-up processes that route boot code for the first processor 100 through the second processor 200. In addition, in the multiprocessor system illustrated in FIG. 2, the link L1 is omitted. Instead, data can be transmitted between the first processor 100 and the second processor 200 via the multiport DRAM 400.

Figure 3:
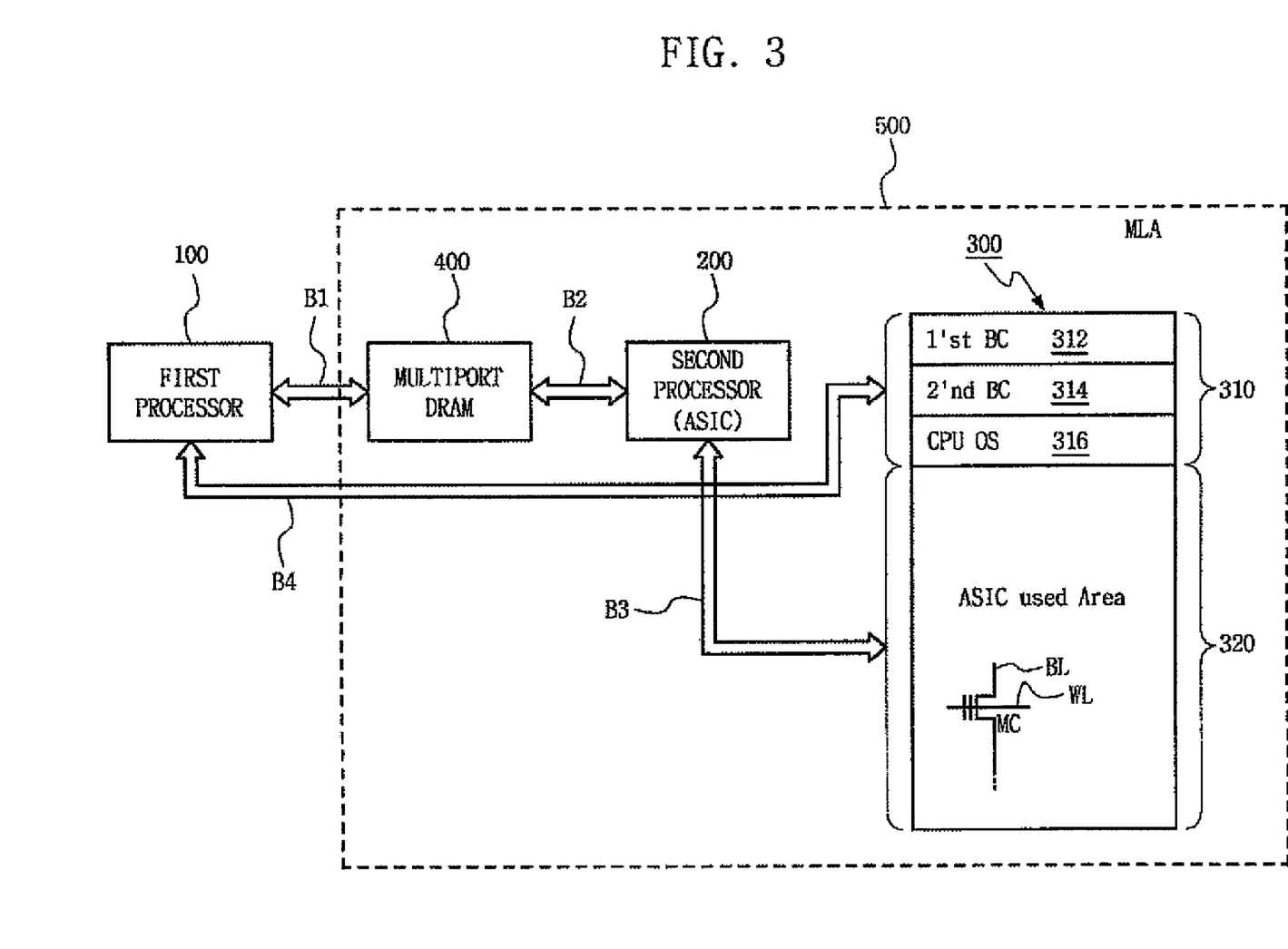
FIG. 3 is a block diagram further detailing the multiprocessor system in FIG. 2, according to an embodiment of the invention.

FIG. 3 is a block diagram further detailing the multiprocessor system in FIG. 2, according to an embodiment of the invention. In the illustrated example, the second processor 200 is an Application-Specific Integrated Circuit (ASIC). As illustrated in FIG. 3, the flash memory 300 may be divided into multiple areas. A boot code storage area 310 is dedicated to the first processor 100, and an ASIC storage area 320 is dedicated to the second processor 200. The first processor 100 can indirectly access data in the storage area 320 via a DRAM interface in a normal operating mode. The boot code storage area 310 can be further divided into a first boot code (BC) storage area 312, a second boot code (BC) storage area 314, and an operating system (OS) storage area 316.

In FIG. 3, the portion of the multiprocessor system that includes the multiport DRAM memory device 400, the second processor 200, and the flash memory 300 forms a Memory Link Architecture (MLA) 500. The first processor 100 is outside of the MLA 500. Thus, the first processor 100 directly accesses the boot code storage area 310 of the flash memory device 300 via the bus B4. Such access advantageously improves the speed and reliability of a booting operation in the first processor 100. In embodiments of the invention, bus B4 is only used for booting operations; thereafter, the processor 100 accesses data in the multiport DRAM device 400 via bus B1 in normal operation.

Figure 4:
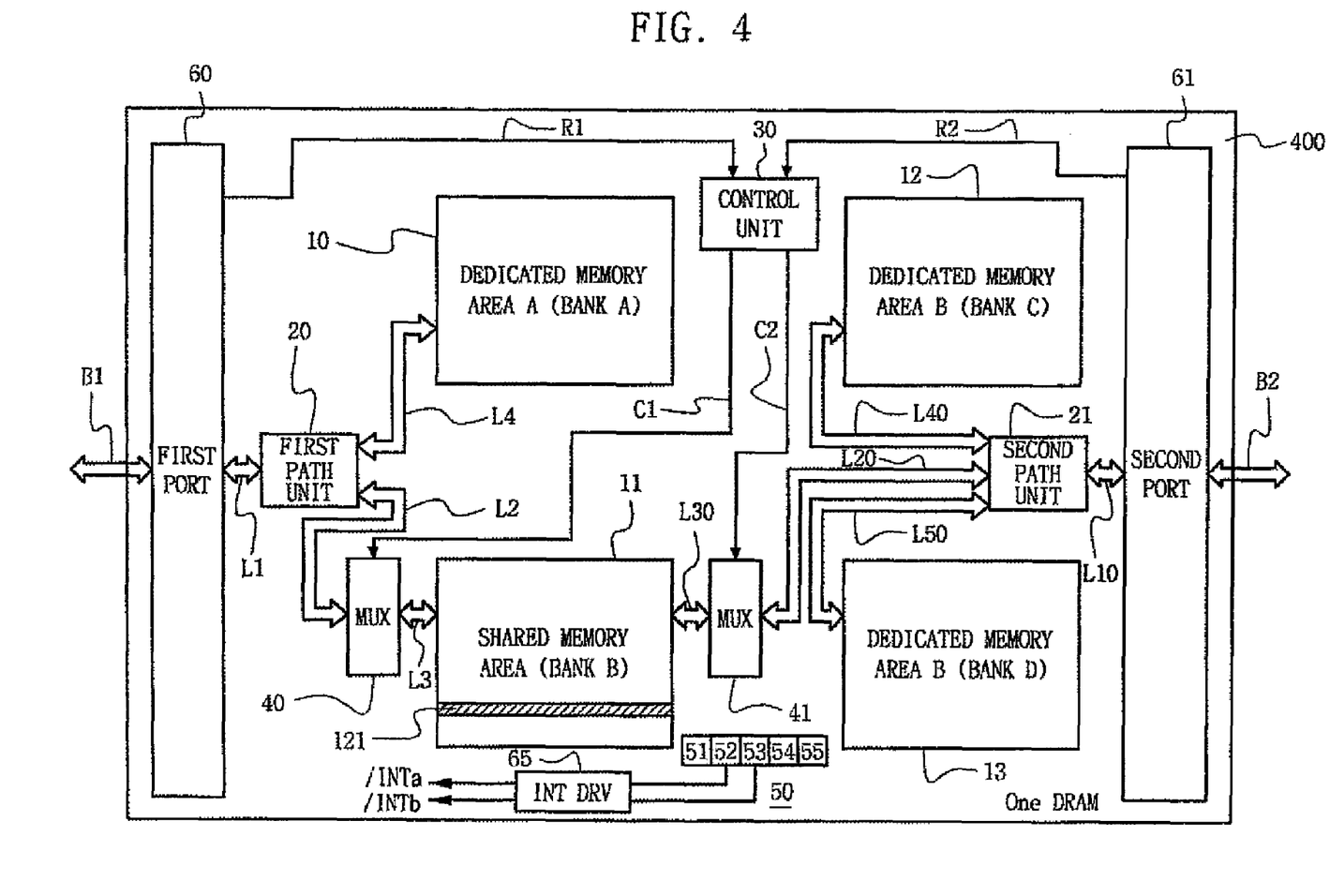
FIG. 4 is a block diagram of the multiport semiconductor memory device shown in FIG. 2, according to an embodiment of the invention.

FIG. 4 is a block diagram of the multiport semiconductor memory device shown in FIG. 2, according to an embodiment of the invention. As shown therein, the multiport semiconductor memory device 400 includes at least one shared memory area 11. The first processor 100 can access the shared memory area 11 through the first port 60, and the second processor 200 can access the shared memory area 11 through the second port 61. A dedicated memory area A, 10 is accessed by first processor 100 through the first port 60. Dedicated memory areas B, 12 and 13 are accessed by second processor 200 through the second port 61.

In FIG. 4, internal register 50 provides an interface to the first and second processors 100 and 200, and may be or include, for instance, a flip-flop, data latch or SRAM cell. The internal register 50 includes a semaphore (SMP) area 51, first mailbox area (MA→B) 52, second mailbox area (MB→A) 53, check bit (CHK) area 54, and reserve (Rvd) area 55.

The SMP 51 controls access to the shared memory area 11. The first and second mailboxes 52 and 53 store, for example, a shared memory address, data, or commands being transmitted between processors. For example, the first mailbox area 52 may store data and commands being sent from the first processor 100 to the second processor 200, and the second mailbox area 53 may store data and commands being sent from the second processor 200 to the first processor 100.

A control unit 30 couples the shared memory area 11 to one of the first and second processors 100 and 200. A signal line R1 connected between the first port 60 and the control unit 30 transfers a first external signal applied through bus B1 from the first processor 100. A signal line R2 connected between the second port 61 and the control unit 30 transfers a second external signal applied through bus B2 from the second processor 200. The first and second external signals may include a row address strobe signal RASB, write enable signal WEB and bank selection address BA individually applied through the first and second ports 60 and 61.

Signal line C1 transfers a path decision signal MA from the control unit 30 to the multiplexer (MUX) 40 to couple the shared memory area 11 to the first port 60. Signal line C2 transfers a path decision signal MB from the control unit 30 to the MUX 41 to couple the shared memory area 11 to the second port 61. The first path unit 20 couples the MUX 40 and the dedicated memory area 10 to the first port 60. The second path unit 21 couples the MUX 41 and dedicated memory areas 12 and 13 to the second port 61.

Figure 5A:
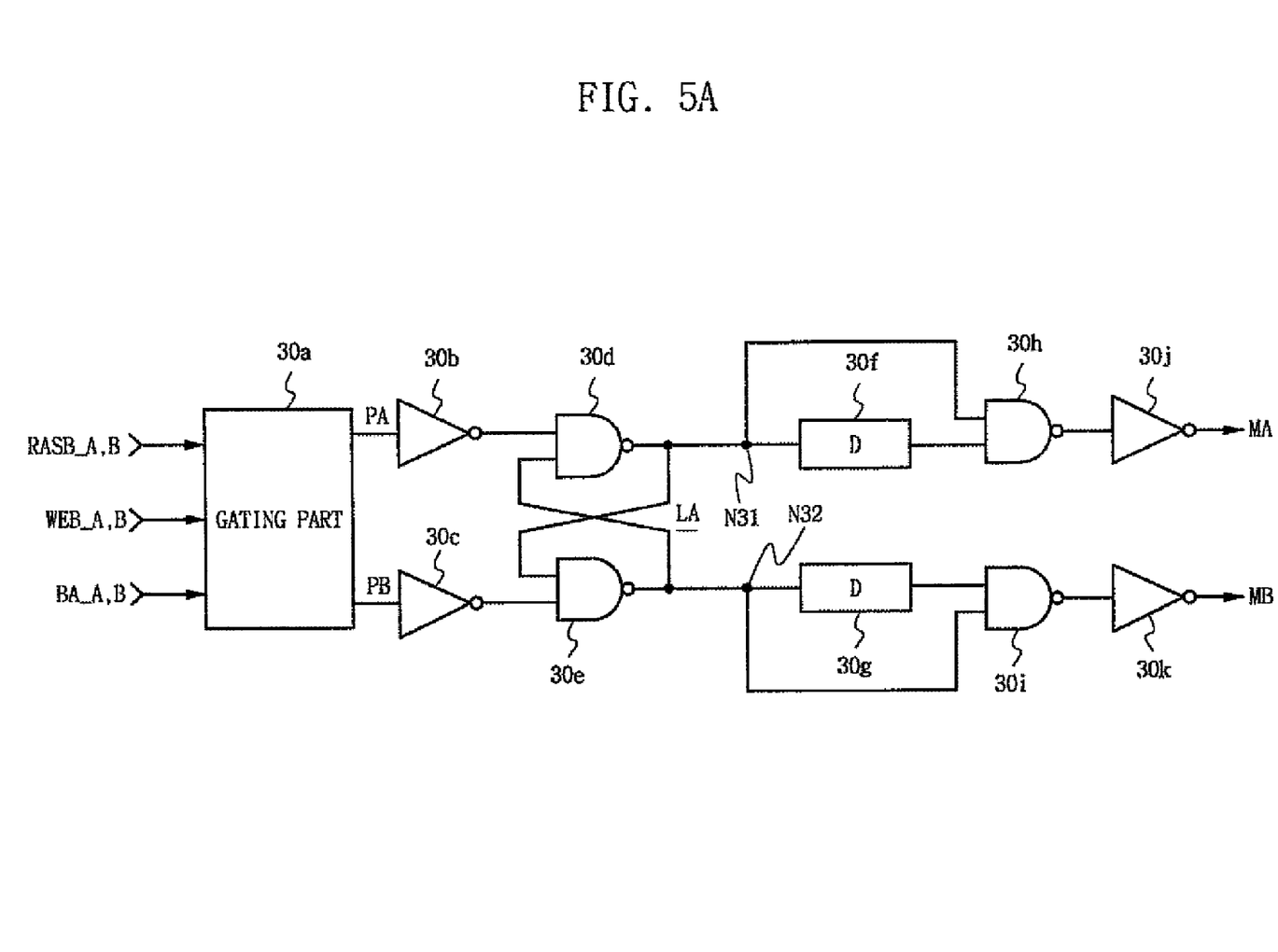
FIGS. 5A and 5B are diagrams of the control unit shown in FIG. 4, and timings for operation thereof, according to an embodiment of the invention.
Figure 5B:
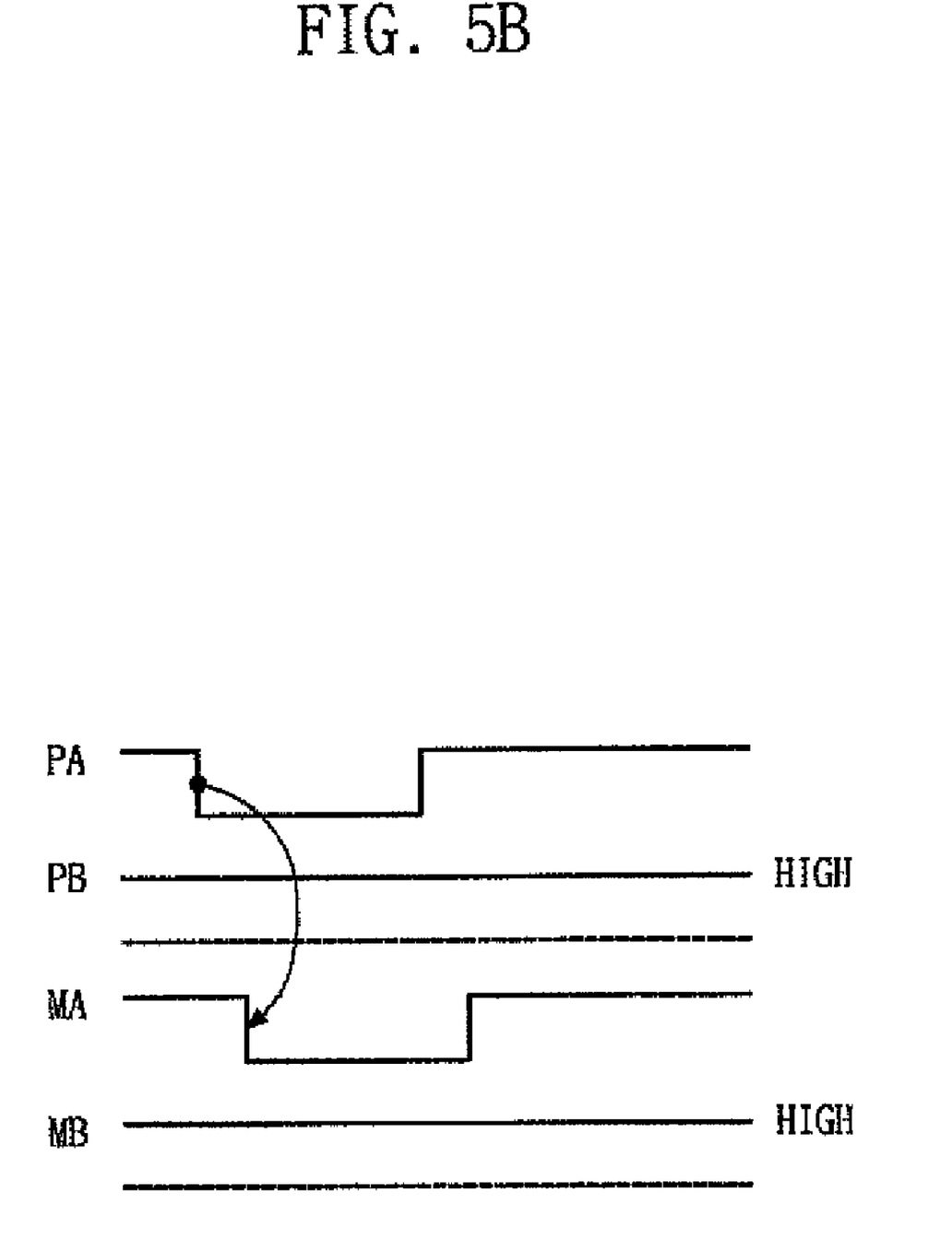

FIGS. 5A and 5B are diagrams of the control unit shown in FIG. 4, and timings for operation thereof, according to an embodiment of the invention. As shown therein, a gating part 30a receives a bank selection address BA_A, BA_B, a write enable signal WEB_A, WEB_B and a row address strobe signal RASB_A, RASB_B from the corresponding first and second ports 60 and 61. The gating part 30a outputs gating signals PA and PB.

When a row address strobe signal RASB is received from one of the ports, the gating part 30a assigns the shared memory area 11 to the corresponding port. When the row address strobe signals RASB_A and RASB_B are applied simultaneously, the gating part 30a provides access to the shared memory area 11 based on a predetermined priority specification.

The control unit 30 also includes inverters 30b, 30c, 30j and 30k, a latch LA constructed of NAND gates 30d and 30e, delay devices 30f and 30g, and NAND gates 30h and 30i, coupled as illustrated in FIG. 5A. The path decision signal MA is a delayed and latched variant of the gating signal PA. The path decision signal MB is a delayed and latched variant of the gating signal PB. An example of such relationship is illustrated in the timing diagram of FIG. 5B.

Figure 6:
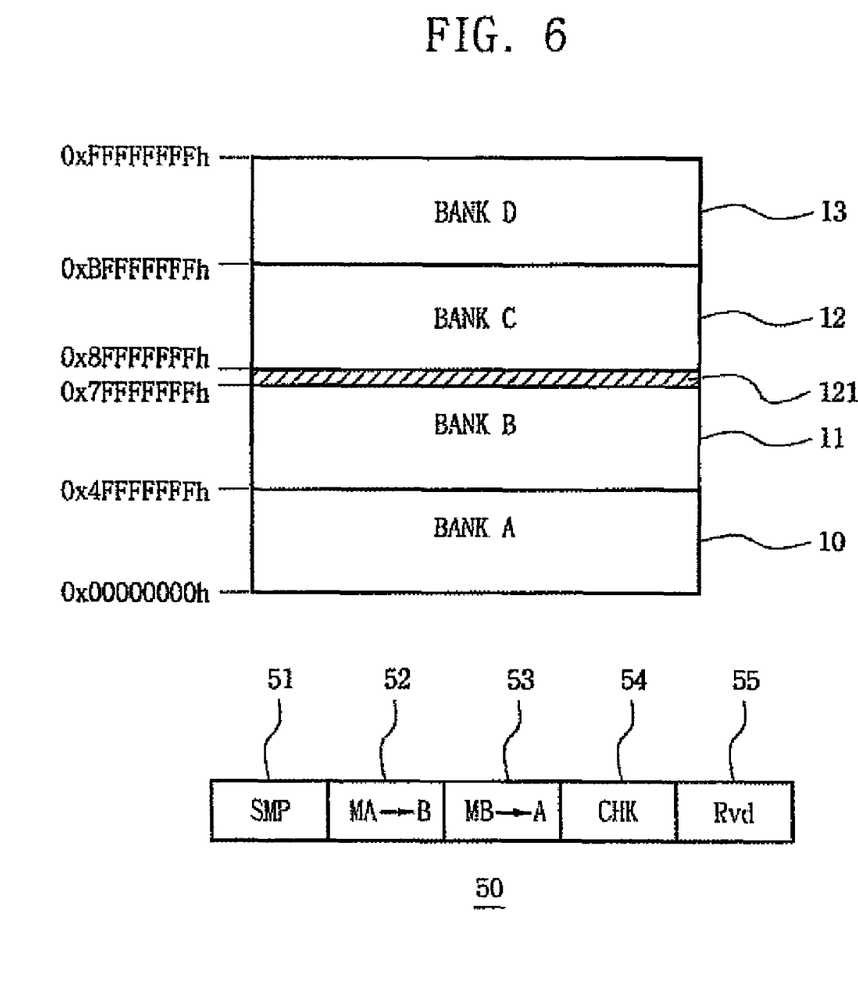
FIG. 6 is a memory map of the multiport semiconductor memory device and internal register shown in FIG. 4, according to an embodiment of the invention.

FIG. 6 is a memory map of the multiport semiconductor memory device and internal register shown in FIG. 4, according to an embodiment of the invention. As shown in FIG. 6, the areas 51-55 of the internal register 50 may be enabled in common by a specific row address, and may be individually accessed by an applied column address. For example, when a row address 0x7FFFFFFFh~0x8FFFFFFFh associated with area 121 of the shared memory area 11 is received in the multiport DRAM 400, area 121 of the shared memory area 11 is disabled, and the internal register 50 is enabled. As a result, the semaphore area 51 and mailbox areas 52 and 53 are accessed by using a direct address mapping method. A command associated with a disabled address is decoded and mapped to a DRAM internal register. The semaphore area 51, the first mailbox area 52 and the second mailbox area 53 may be each assigned 16 bits, and the check bit area 54 may be assigned 4 bits. Other register sizes could also be used, according to design choice.

Figure 7:
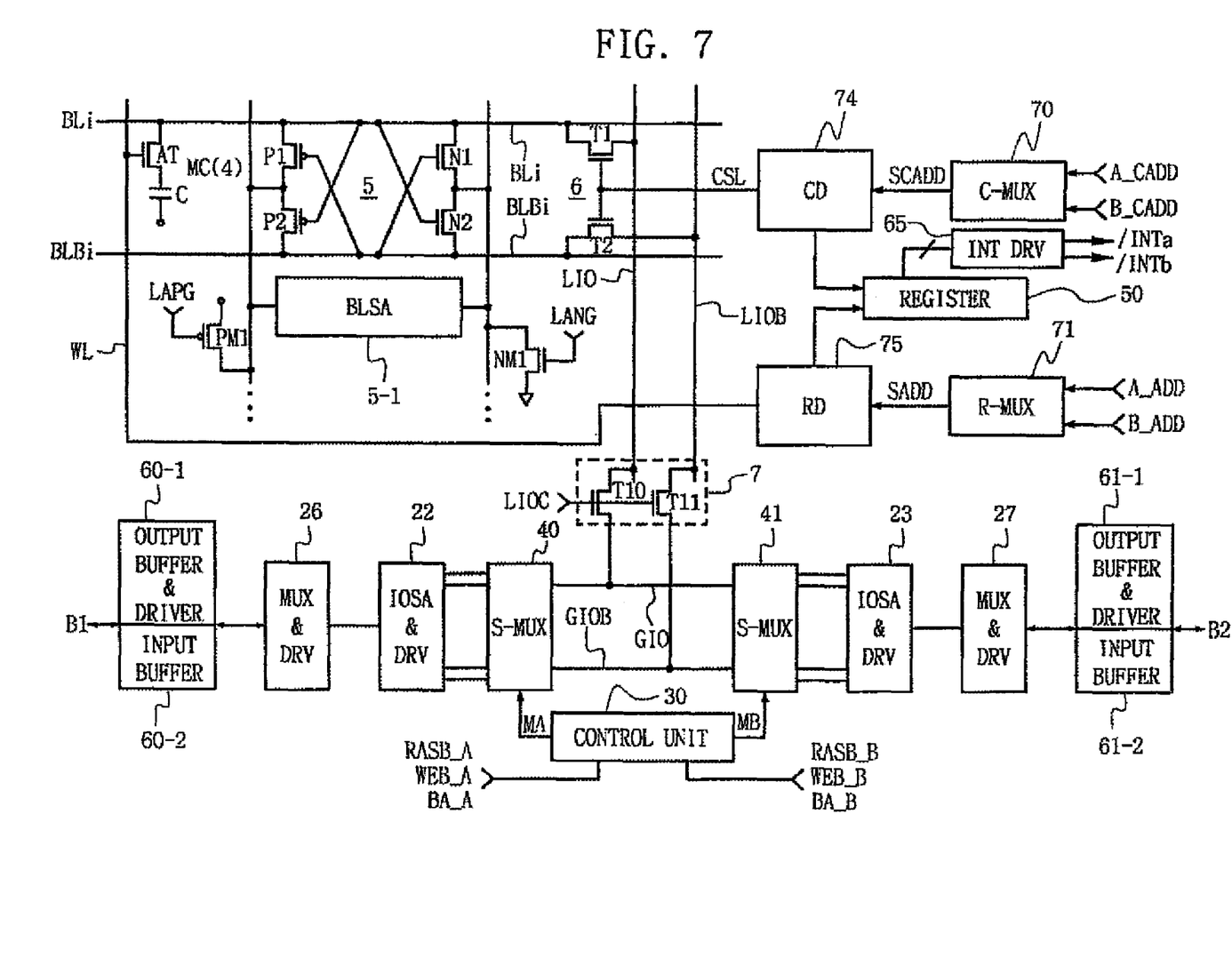
FIG. 7 is a detailed block diagram of a portion of the multiport semiconductor memory device shown in FIG. 4, according to an embodiment of the invention.
Figure 8:
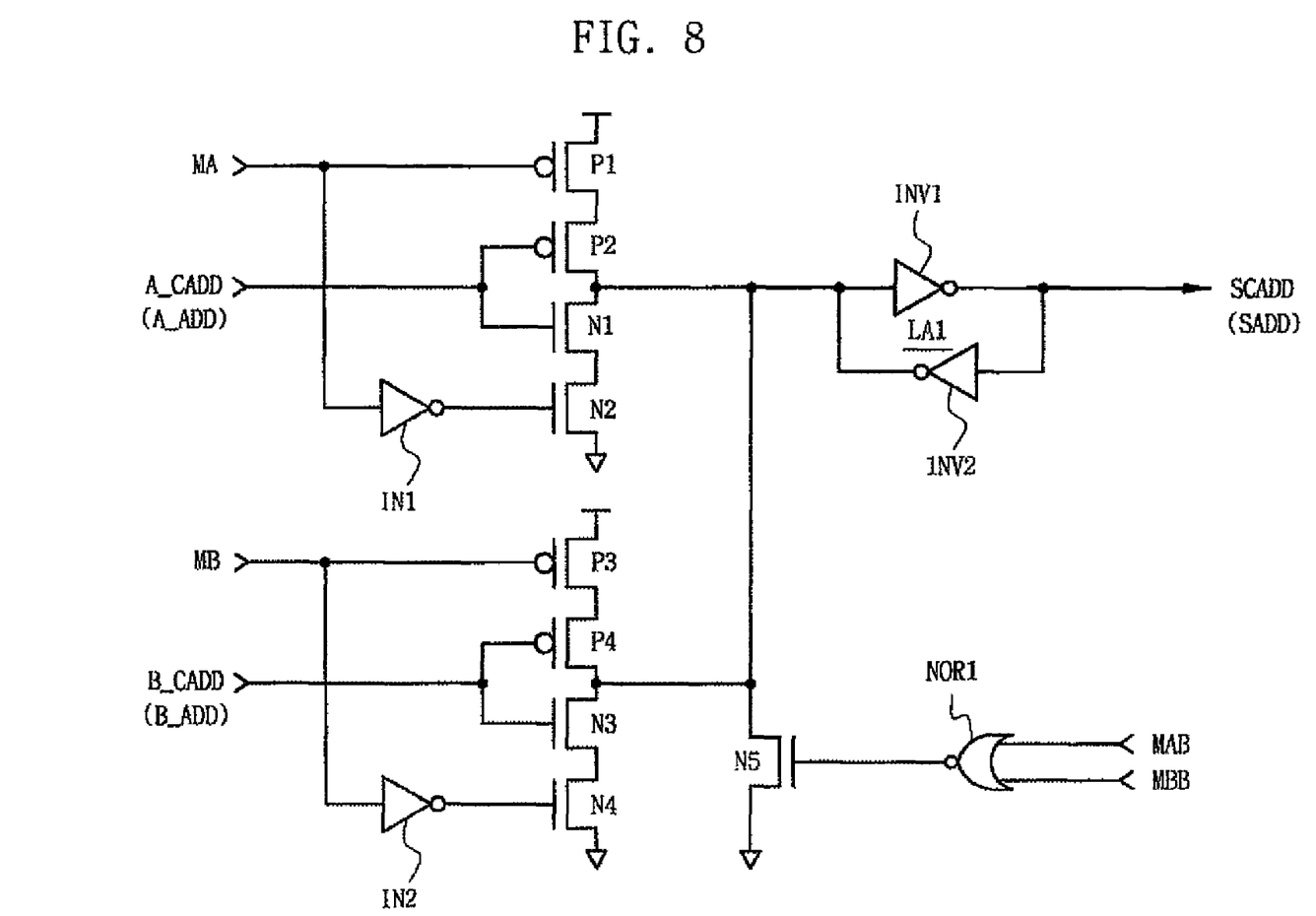
FIG. 8 is a circuit diagram of the address multiplexer shown in FIG. 7, according to an embodiment of the invention.

FIG. 7 is a detailed block diagram of a portion of the multiport semiconductor memory device shown in FIG. 4, according to an embodiment of the invention. FIG. 8 is a circuit diagram of the address multiplexer shown in FIG. 7, according to an embodiment of the invention. FIG. 8 is described first.

FIG. 8 illustrates an example of the row address multiplexer 71 and column address multiplexer 70 shown in FIG. 7. The same circuit can function as either a row address multiplexer or a column address multiplexer, according to the input signal. The address multiplexer includes two clocked-CMOS inverters constructed of PMOS transistors P1-P4 and NMOS transistors N1-N4, and an inverter latch LA1 constructed of inverters INV1 and INV2. The clocked CMOS inverters each receive an address (for example A_CADD and B_CADD, in the case of a column address multiplexer) at an input port, and select one of two inputs according to a logic state of the path decision signals MA and MB. The address multiplexer outputs the selected address (for example, a selected column address SCADD). An NMOS transistor N5 and a NOR gate NOR1 are adapted to provide a discharge path between an input terminal of the inverter latch LA1 and ground. Inverters IN1 and IN2 are adapted to invert a logic state of the path decision signals MA and MB.

As an example of operation, when the path decision signal MA is applied with a logic low level, column address A_CADD received through the first port 60 is inverted through an inverter constructed of PMOS transistor P2 and NMOS transistor N1, is again inverted through the inverter INV1, and then is output as the selected column address SCADD. In this case, the path decision signal MB is applied with a logic high level. Thus column address B_CADD received through the second port 61 is not provided to an input terminal of the latch LA1 since the inverter constructed of PMOS transistor P4 and NMOS transistor N3 has an inactive state. As a result, column address B_CADD, is not output as the selected column address SCADD. When an output of the NOR gate NOR1 becomes a high level, the NMOS transistor N5 is turned on and a logic level latched to the latch LA1 is set to a low level.

Turning now to the portion of the multiport DRAM device 400 illustrated in FIG. 7, a memory cell MC (4) is a memory cell belonging to the shared memory area 11 in FIGS. 2, 4, and 6. The S-MUX 40 and S-MUX 41 are disposed symmetrically on the shared memory area 11. Likewise, an input/output sense amplifier (IOSA) and driver (DRV) 22 is disposed near the S-MUX 40, and an IOSA and DRV 23 is disposed near the S-MUX 41.

Within the shared memory area 11, the memory cell MC (4) includes an access transistor AT and a storage capacitor C. The memory cell MC (4) is connected to a word line WL and bit line BLi. In particular, the word line WL is disposed between a gate of access transistor AT of the memory cell MC (4) and a row decoder 75. The row decoder (RD) 75 applies a decoded row signal to the word line WL or the internal register 50 in response to a selection row address SADD of the row address multiplexer 71. A bit line BLi constituting a bit line pair is coupled to a drain of the access transistor AT and a column selection transistor T1. A complementary bit line BLBi is coupled to a column selection transistor T2. PMOS transistors P1 and P2 and NMOS transistors N1 and N2 coupled to the bit line pair BLi, BLBi constitute a bit line sense amplifier 5. Sense amplifier driving transistors PM1 and NM1 each receive a corresponding drive signal LAPG, LANG, and drive the bit line sense amplifier 5. A column selection gate 6 constructed of the column selection transistors T1 and T2 is coupled to a column selection line CSL transferring a decoded column signal of the column decoder 74. The column decoder 74 outputs a decoded column signal to the column selection line CSL and the internal register 50 in response to a selected column address SCADD of the column address multiplexer 70.

With further reference to FIG. 7, a local input/output line pair LIO, LIOB is coupled to a first multiplexer 7. When transistors T10 and T11 included in the first multiplexer 7 are turned on in response to a local input/output line control signal LIOC, the local input/output line pair LIO, LIOB is coupled to a global input/output line pair GIO, GIOB. Then, data of the local input/output line pair LIO, LIOB is transferred to the global input/output line pair GIO, GIOB in a data read operating mode. On the other hand, write data applied to the global input/output line pair GIO, GIOB is transferred to the local input/output line pair LIO, LIOB in a data write operating mode. The local input/output line control signal LIOC may be a signal generated in response to a decoded signal output from the row decoder (RD) 75.

When the path decision signal MA output from control unit 30 has an active state, read data transferred to the global input/output line pair GIO, GIOB is transferred to the input/output sense amplifier (IOSA) and driver 22 through the S-MUX 40. The IOSA 22 amplifies data whose level has weakened according to the transfer procedure through several data paths. Read data output from the IOSA 22 is transferred to the first port 60 through MUX and driver 26. At this same time, the path decision signal MB is in an inactive state. Thus the S-MUX 41 is disabled and the second processor 200 cannot access the shared memory area 11. However, in this case, the second processor 200 can still access the dedicated memory areas 12 and 13 through the second port 61.

When path decision signal MA output from the control unit 30 has an active state, write data received through the first port 60 is transferred to the global input/output line pair GIO, GIOB, sequentially passing through the MUX and driver 26, IOSA and driver 22, and the S-MUX 40. When the multiplexer 7 is activated, the write data is transferred to local input/output line pair LIO, LIOB and then is stored in a selected memory cell, for example MC(4).

An output buffer and driver 60-1 and input buffer 60-2 shown in FIG. 7 may correspond to or be included in the first port 60. An output buffer and driver 61-1 and input buffer 61-2 shown in FIG. 7 may correspond to or be included in the second port 61.

The first and second processors 100 and 200 commonly use circuit devices and lines that are adapted between global input/output line pair GIO, GIOB and memory cell MC (4) in an access operation, and independently use input/output related circuit devices and lines adapted between the corresponding port and S-MUX devices 40 and 41.

Accordingly, flash memory 300 directly provides the boot code in a boot operation of first processor 100, and is accessed by the second processor 200 in a normal operating mode. In the normal operating mode, the first processor 100 can indirectly access data stored in the flash memory through the multiport DRAM device 400 with the assistance of the second processor 200.

In one embodiment of the invention, the second processor 200 is configured to boot first from the flash memory 300 upon power-up. At a first predetermined time, the multiport DRAM device 400 outputs a reset enable signal to the first processor 100. In response, the first processor 100 then boots directly from the flash memory 300 (i.e., without routing the boot code associated with the first processor through the second processor). At a second predetermined time, the multiport DRAM device 400 outputs a reset disable signal to the first processor 100.

In one embodiment, the first and/or the second predetermined time may be associated with the start (or a predetermined delay from the start) of a boot sequence associated with the second processor. In the alternative, or in combination, the first and/or the second predetermined time may be associated with the completion (or a predetermined delay from the completion) of a boot sequence associated with the second processor.

It will be apparent to those skilled in the art that modifications and variations can be made in the present invention without deviating from the spirit or scope of the invention. For example, the configuration for a shared memory bank of multiport semiconductor memory device or the configuration and access method of an internal register circuit may be varied, according to design choice. In addition, the multiprocessor system architectures described herein are applicable to multiprocessor systems having three or more processors. Moreover, in the multiprocessor system, one or more processors may be a microprocessor, a Central Processing Unit (CPU), a Digital Signal Processor (DSP), a micro-controller, a reduced-command set computer, a complex command set computer, or the like. Furthermore, the scope of the invention is not limited to any special combination of processors or applications used in the above-described embodiments. And although embodiments of the invention illustrated nonvolatile memory with reference to flash memory devices and volatile memory with reference to DRAM devices, the invention could be adapted to other memory device types. Thus, it is intended that the present invention cover any such modifications and variations of this invention provided they come within the scope of the appended claims and their equivalents.

What is claimed is:

1. A multiprocessor system comprising:
   a first processor configured to perform a first predetermined task;
   a second processor configured to perform a second predetermined task;
   a multiport semiconductor memory device coupled to the first processor and the second processor, the multiport semiconductor memory device including at least one shared memory area, the multiport semiconductor memory device configured to provide access to the at least one shared memory area by the first processor and the second processor; and
   a non-volatile memory device coupled directly to the first processor via a first dedicated bus and coupled directly to the second processor via a second dedicated bus separate from the first dedicated bus, the non-volatile memory device storing a first boot code associated with the first processor and a second boot code associated with the second processor,
   wherein the multiprocessor system is configured to provide the first processor direct access to the non-volatile memory device via the first dedicated bus during a boot operation, and indirect access to the non-volatile memory device via the shared memory area otherwise.

2. The multiprocessor system of claim 1, wherein the multiport semiconductor memory device further includes:
   a first dedicated memory area that can be accessed by the first processor and not the second processor; and
   a second dedicated memory area that can be accessed by the second processor and not the first processor.

3. The multiprocessor system of claim 1, wherein the multiport semiconductor memory device further includes an internal register disposed outside the memory cell array, the internal register being responsive to a predetermined address of the shared memory area to provide a data interface function between the first processor and the second processor.

4. The multiprocessor system of claim 3, wherein the internal register includes:
   a first mailbox area configured to store a message from the second processor to the first processor; and
   a second mailbox area configured to store a message from the first processor to the second processor.

5. The multiprocessor system of claim 4, wherein the internal register includes a semaphore area.

6. The multiprocessor system of claim 1, wherein the multiport semiconductor memory device includes a plurality of Dynamic Random Access Memory (DRAM) cells.

7. The multiprocessor system of claim 1, wherein the non-volatile memory device is a flash memory device.

8. The multiprocessor system of claim 7, wherein the non-volatile memory device is a NAND-type flash memory device.

9. The multiprocessor system of claim 1, wherein the non-volatile memory device includes:
- a first dedicated memory area that can be accessed by the first processor and not the second processor; and
- a second dedicated memory area that can be directly accessed by the second processor and not the first processor, the multiprocessor system configured to provide data from the second dedicated area to the first processor via the second processor and the multiport semiconductor memory device.

10. The multiprocessor system of claim 9, wherein the first dedicated memory area includes:
- a first boot code storage area storing the first boot code; and
- a second boot code storage area storing a third boot code.

11. The multiprocessor system of claim 10, wherein the first dedicated memory area further includes an Operating System (OS) storage area.

12. The multiprocessor system of claim 1, wherein the multiprocessor system is configured to perform a boot-up method, the boot-up method comprising:
- reading the second boot code from the non-volatile memory device into the second processor;
- booting the second processor using the second boot code;
- outputting a reset enable signal from the multiport semiconductor memory device to the first processor at a first predetermined time;
- reading the first boot code directly from the non-volatile memory device into the first processor; and
- booting the first processor using the first boot code.

13. The multiprocessor system of claim 12, wherein the first predetermined time is the start of the booting the second processor.

14. The multiprocessor system of claim 12, wherein the first predetermined time is at a predetermined delay from the start of the booting the second processor.

15. The multiprocessor system of claim 12, wherein the first predetermined time is at the completion of the booting the second processor.

16. The multiprocessor system of claim 12, wherein the first predetermined time is at a predetermined delay from the completion of the booting the second processor.

17. The multiprocessor system of claim 12, the boot-up method further comprising outputting a reset disable signal from the multiport semiconductor memory device to the first processor at a second predetermined time.

18. The multiprocessor system of claim 17, wherein the second predetermined time is at a predetermined delay from the start of the booting the second processor.

19. The multiprocessor system of claim 17, wherein the second predetermined time is the completion of the booting the second processor.

20. The multiprocessor system of claim 17, wherein the second predetermined time is at a predetermined delay from the completion of the booting the second processor.

* * * * *